United States Patent
Liuti et al.

(10) Patent No.: US 7,111,396 B2
(45) Date of Patent: Sep. 26, 2006

(54) PROCESS FOR THE PRODUCTION OF A STEERING WHEEL FOR A MOTOR VEHICLE

(75) Inventors: Paolo Liuti, S. Martino Buon Albergo (IT); Daniele Antolini, Illasi (IT)

(73) Assignee: Dalpa S.N.C., (IT)

( * ) Notice: Subject to any disclaimer, the term of this patent is extended or adjusted under 35 U.S.C. 154(b) by 234 days.

(21) Appl. No.: 10/486,550

(22) PCT Filed: Aug. 7, 2002

(86) PCT No.: PCT/IT02/00527

§ 371 (c)(1),
(2), (4) Date: Feb. 9, 2004

(87) PCT Pub. No.: WO03/013939

PCT Pub. Date: Feb. 20, 2003

(65) Prior Publication Data

US 2004/0237703 A1 Dec. 2, 2004

(30) Foreign Application Priority Data

Aug. 9, 2001 (IT) .......................... VR2001A0088

(51) Int. Cl.
B21D 53/26 (2006.01)
B62D 1/04 (2006.01)

(52) U.S. Cl. ........................... 29/894.1; 74/552
(58) Field of Classification Search ............... 29/894.1; 74/552
See application file for complete search history.

(56) References Cited

U.S. PATENT DOCUMENTS 6,471,808 B1 * 10/2002 Testa et al. ................ 156/182
6,668,682 B1 * 12/2003 Emeneth et al. ............. 74/552
2003/0084748 A1 * 5/2003 Shimizu et al. .............. 74/552
2004/0149074 A1 * 8/2004 Menalso et al. ............. 74/552

FOREIGN PATENT DOCUMENTS

| DE | 4418960 | * 12/1995 |
| DE | 19746472 | * 4/1999 |
| EP | A1-1029771 | 4/1999 |
| EP | A1-1029770 | 8/2000 |
| JP | 2000-038139 | * 2/2000 |
| WO | WO 02-0005123 | 2/2000 |

OTHER PUBLICATIONS 439023, filed Nov. 2000, RD.*
International Search Report of Dec. 10, 2002 by EPO, NL-2280 HV Rijswijk.

* cited by examiner

*Primary Examiner*—Eric Compton
(74) *Attorney, Agent, or Firm*—Greenberg Traurig LLP

(57) ABSTRACT

A procedure for the manufacture of a steering wheel for motor vehicles consisting of an outer covering in composite material, comprising the preparation of the covering by means of composite elements with a laminar structure, the hot forming of these elements in order to obtain a pair of complementary shells (13a, 13b), the assembly of the shells on the opposite sides of the steering wheel, in which the body of the steering wheel consists of a metal core (11) buried inside synthetic resin, and in that at least one of the shells forming the opposite sides of the covering is equipped with a support element (14a, 14b) which allows it to be coupled to the other shell complementary to it.

2 Claims, 1 Drawing Sheet

PROCESS FOR THE PRODUCTION OF A STEERING WHEEL FOR A MOTOR VEHICLE

TECHNICAL FIELD

This invention refers to a procedure for the manufacture of a steering wheel for motor vehicles consisting of an external covering in composite material.

More in particular, this invention refers to a procedure which comprises the preparation of composite elements with a laminar structure, hot forming of the elements to obtain a pair of shells, each having a shape corresponding to half of the steering wheel to be produced, and assembly of the shells on the opposite sides of the steering wheel, the body of the steering wheel consisting of a metal core buried inside synthetic resin.

BACKGROUND ART

It is known that steering wheels for motor vehicles can consist of a structure that comprises a metal core buried inside synthetic resin, and an outer covering consisting, for example, of a bivalve shell which forms the part designed to be gripped and the external appearance of the steering wheel.

One of the various procedures employed in the manufacture of steering wheels for motor vehicles uses two shells to form the outer covering, obtained by hot forming of suitable laminar material.

After the edges have been finished by means of mechanical machining, the shells are respectively applied to the opposite sides of the steering wheel consisting of the metal core and the synthetic resin covering.

The two shells making up the covering are then fixed to each other on the steering wheel by means of gluing along their contact line.

The gluing of these shells often proves to be a key step in the production process as a whole, particularly because the thickness of the shells is minimal, generally a few tenths of a millimeter.

Some solutions are known to the background art that would tend to make the gluing of the shells more resistant; one example is described in the patent application EP-A1-1029770 where the edges of the shells forming the covering are mechanically machined in such a way to obtain a male female type complementary joint that couples together when the two shells are applied to the body of the steering wheel.

The solution proposed by the previous patent clearly tends to increase the contact surface along the edge of the shells so as to improve the fixing and the gluing.

The solution presented by the patent application EP-A1-1029770 is inevitably insufficient and difficult to apply when the thickness of the shells is minimal and not easy to machine; in fact the shells often tend to break and to develop cracks during the mechanical machining of the edges to form the coupling surfaces.

A further typical example in which the gluing problem becomes evident is when carbon fibre shells are used.

In the patent application EP-A1-1029771 the fixing phase of the two shells on the body of the steering wheel comprises a previous stage in which the support sections are applied and fixed on the synthetic resin body of the steering wheel.

These sections are shaped to form a base for the support and fixing of the two shells.

In practice the sections are normally made of metal, typically aluminum which permits easy clinching to the body of the steering wheel and a particular aesthetic appearance when the section is left on view as described in the patent application EP-A1-1029771.

On the other hand, however, the use of metal material is particularly disadvantageous in consideration of the great difference in the coefficient of thermal expansion of these materials compared with the materials used to manufacture the coverings.

In fact, as the steering wheels of motor vehicles are subject to high temperature ranges the great difference in the coefficient of thermal expansion of these materials inevitably leads to the two shells forming the outer covering becoming detached.

In addition to the aforesaid drawback, the procedure described in the patent EP-A1-1029771 presents a further disadvantage in consideration of the particular machining that the body of the steering wheel must undergo.

The gluing or clinching of the sections must in fact be carried out with particular precision so as to avoid problems when fitting the shells on the body of the steering wheel and the unsightly appearance of the end product.

Document WO-A2-0005123 describes a steering wheel comprising a decorative covering especially with decorative wood. The steering wheel frame is provided with a foam sheathing in the area (3, 4) which are provided for the decorative covering and which comprise outer dimensions that are smaller than those of the remaining areas. Furthermore, the above document describes that one dimensionally stable decorative covering part is fastened on said foam sheathing and at least one centering means is provided between the foam and the decorative covering part.

The procedure for manfacturing a steering wheel according to document WO-A2-0005123 requires the centering of at least one of the shells on the body of the steering wheel and furthermore the gluing involve not only the shells but also the body of the steering wheel. These are clearly strong drawbacks since the deformations of the material due to the high variance of the temperatures inside the car cause an alteration in the stability of the steering wheel.

DESCRIPTION OF THE INVENTION

The present invention aims to overcome the drawbacks comprised in the background art by means of a procedure that comprises the preparation of composite elements with a laminar structure, hot forming of the elements to obtain a pair of shells, each having a shape corresponding to half of the steering wheel to be produced, and assembly of the shells on the opposite sides of the steering wheel, the body of the steering wheel consisting of a metal core buried inside synthetic resin.

This is achieved by means of a procedure with the features described in the main claim.

The dependent claims describe advantageous embodiments of the invention.

The procedure according to the present invention comprises a phase, carried out before assembly on the body of the steering wheel, in which the shells are fitted on internal elements designed to ensure effective and long-lasting gluing both to the steering wheel and between the two shells comprising the covering.

According to a particularly advantageous form of embodiment of the invention, after mechanical finishing of the relative edges an element with the structure of a particularly thin shell, and a wider cross-section than the shell to which it is applied and which will form the outer covering of the steering wheel, is glued inside a first shell comprising the covering and obtained by hot forming.

The second shell comprising the covering is fitted over the projections of the inner shell applied to the first shell, being fixed by gluing.

According to a particularly advantageous form of embodiment of the invention, an element with the structure of a particularly thin second shell, and a smaller cross-section than the shell to which it is applied, is fixed inside both shells forming the covering of the steering wheel.

In this case, the elements are applied displaced with respect to the edges of the shells so that one of the edges of the applied element projects slightly with respect to the edge of one of the shells.

Two shells are thus obtained and used to form the covering of a steering wheel for motor vehicles, having a structure at their respective edges which is very similar to a male female joint structure obtained without any specific machining of the edges, a process which would be particularly delicate in view of the minimal thickness of the shells.

This particular form of embodiment according to the invention also makes it possible to guarantee support and reinforcement of the shells making up the covering of the steering wheel and in the assembly stage to distribute any elastic stress on both parts of the structure and not solely on one of the two as in the previous form of embodiment.

According to another form of embodiment of the invention, the elements applied to the shells forming the covering of the steering wheel consist of flat plates with an elongated structure.

These elements are applied to the edges of the shells to create the coupling system as for the previously described form of embodiment.

ILLUSTRATION OF THE DRAWINGS

Other features and advantages of the invention will become evident on reading the following description of some forms of embodiment of the invention, given as nonbinding examples, with the help of the enclosed drawings, in which.

DESCRIPTION OF SOME FORMS OF EMBODIMENT

Figures 1, 2, 3:
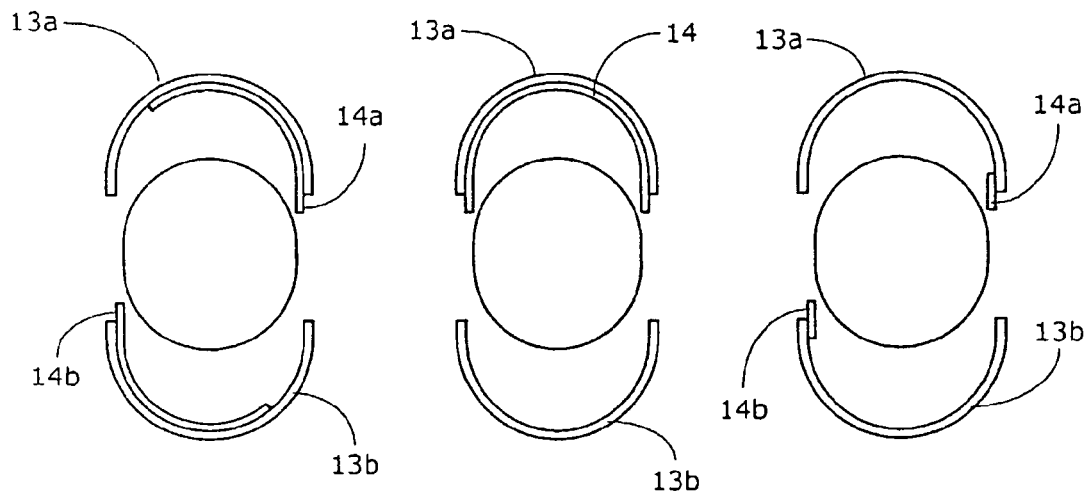
FIG. 1 represents, in largely schematic form, a first embodiment of a procedure for the manufacture of a steering wheel for motor vehicles according to the present invention.
FIG. 2 represents, in largely schematic form, a second embodiment of a procedure for the manufacture of a steering wheel for motor vehicles according to the present invention.
FIG. 3 represents, in largely schematic form, a third embodiment of a procedure for the manufacture of a steering wheel for motor vehicles according to the present invention.

A classic steering wheel for motor vehicles normally comprises a central part or hub, a plurality of radial spokes and an outer edge.

As is known from forms of embodiment comprised in the background art, the outer edge 10 consists of a metal core 11 buried inside synthetic resin 12.

This is all enclosed in an outer casing consisting for example of a covering 13.

This covering 13 generally consists of two shells 13a, 13b superimposed one on the other and joined together.

These shells 13a, 13b may be produced for example by means of the forming of glass fibre or carbon fibre materials with a laminar structure according to known procedures and additionally treated and machined in order to provide the structure with features of rigidity and gripping stability.

The shells obtained by means of these machining processes, as shown in FIGS. 1 to 3, comprise a convex external side, a concave internal side and edges.

According to a first form of embodiment of the present invention, shown in FIG. 1, elements 14a, 14b which may be made from composite material are applied to the inner side of the shells 13a, 13b and constitute the system which connects and fixes the two shells 13a, 13b forming the covering 13.

Figures 4, 5:
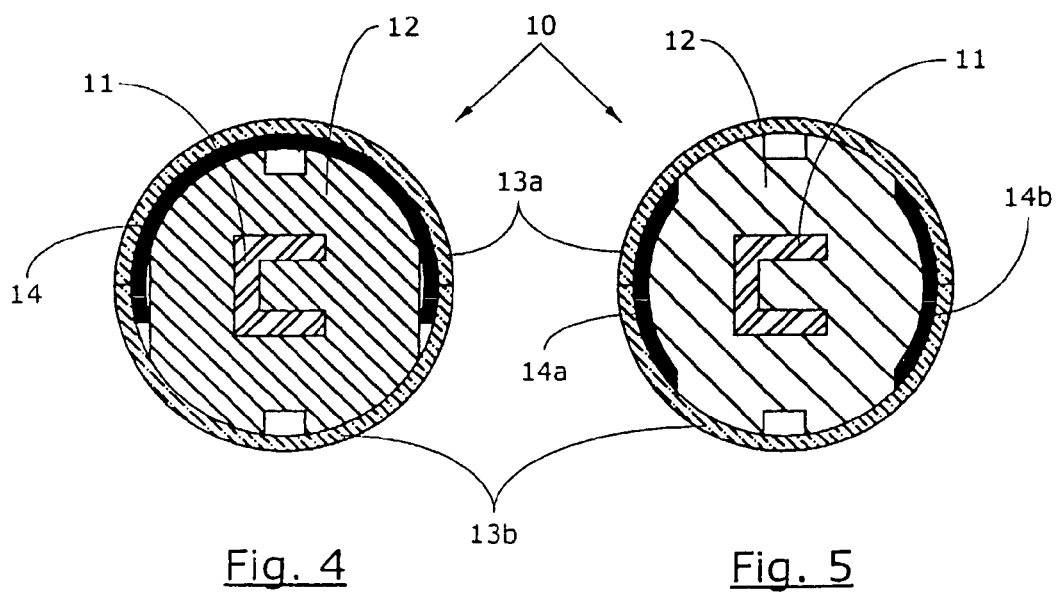
FIGS. 4 and 5 represent two respective cross sections of a steering wheel for motor vehicles manufactured by means of two forms of embodiment of the procedure according to the present invention.

According to a second form of embodiment of the present invention, shown in FIGS. 2 and 4, a similar element 14 is applied to the inner side of the shell 13a in such a way that the edges of this element 14 project with respect to the edges of the shell 13a and can couple and be joined for example by means of gluing to the edges of the second shell 13b forming the covering of the steering wheel According to a third form of embodiment of the present invention, shown in FIGS. 3 and 5, an element 14a, 14b is applied to the inner side of both shells 13a and 13b near a respective edge in such a way that the edges of this element 14 project with respect to the edges of the shell 13a and can couple and be joined for example by means of gluing to the edges of the second shell 13b forming the covering of the steering wheel.

The elements 14a and 14b applied to the shells 13a and 13b forming the covering of the steering wheel consist in this case of flat plates to be applied, for example by means of gluing, to the edges of the inner sides of the shells.

In detail, the plates 14a and 14b can be glued either to just one of the shells or to both of them, and either to one edge of the shell or to both edges.

The edge of each plate 14a, 14b projects from the edge of one of the shells in such a way that it can couple with the edge of the other shell forming the covering and be glued to it.

The invention was previously described with reference to some preferred forms of embodiment of the same.

However it is clear that the present is susceptible to several variations within the scope of the present invention, in the field of the technical equivalences.

The invention claimed is:

1. A process for the production of a steering wheel for motor vehicles, comprising the steps of: providing a substantially circular-shaped metal core (11); burying said metal core (11) inside a synthetic resin (12), thereby forming a steering wheel body; preparing a pair of outer covering shells (13a, 13b) by means of hot forming of composite elements with a laminated structure, said shells (13a, 13b) having a complementary shape and being suitable to be placed over said steering wheel body and joined together along their edges; preparing a system (14) for connecting and fastening to each other said shells (13a, 13b), said system being constituted by a thin element (14) that is fixed to the inner side of one (13a) of said shells in such a way that both edges of said thin element (14) protrude over the edges of said shell (13a), whereby the surface of said thin element (14) protruding over the edges of said shell (13a) forms an area for fastening said thin element (14) to the inner side of the other shell (13b); and joining said two shells (13a, 13b) together along their edges, thereby fixing said other shell (13*b*) to the said protruding surface of said thin element (14); and joining said two shells (13*a*, 13*b*) together along their edges, thereby fixing each respective shell (13*a*, 13*b*) to the said protruding surface of said thin elements (14*a*, 14*b*).

2. A process according to claim 1, wherein said shells (13*a*, 13*b*) are joined together by glueing.

* * * * *